Nov. 11, 1969  D. L. MANNING  3,477,738
AUXILIARY ROAD WHEEL ASSEMBLY
Filed Jan. 16, 1968  2 Sheets-Sheet 1

INVENTOR.
Donald L. Manning
BY
W. F. Wagner
ATTORNEY

Nov. 11, 1969  D. L. MANNING  3,477,738
AUXILIARY ROAD WHEEL ASSEMBLY
Filed Jan. 16, 1968  2 Sheets-Sheet 2

INVENTOR.
Donald L. Manning
BY
W. F. Wagner
ATTORNEY

United States Patent Office 3,477,738
Patented Nov. 11, 1969

3,477,738
AUXILIARY ROAD WHEEL ASSEMBLY
Donald L. Manning, Orchard Lake, Mich., assignor to General Motors Corporation, Detroit, Mich., a corporation of Delaware
Filed Jan. 16, 1968, Ser. No. 698,225
Int. Cl. B62d 61/12, 43/08
U.S. Cl. 280—124                    5 Claims

ABSTRACT OF THE DISCLOSURE

A laterally extending parallelogram linkage auxiliary vehicle wheel suspension unit detachably mounted on a vehicle superstructure having a selectively energizable air spring unit operative to urge the wheel into road engagement under conditions of abnormal vehicle load or subnormal weight limits, and a selectively energizable fluid motor operative to retract the wheel during conditions of normal load and load limits.

---

This invention relates to auxiliary road wheel suspension assemblies and particularly assemblies of the retractable type.

Owing to substantial variance in axle load limitations imposed in various geographic areas, full utilization of certain types of passenger carrying vehicles cannot be realized. Thus, conventional intra-city buses not infrequently are barred from effective use in otherwise feasible inter-city operation due to short range roadways in which the axle load limitations are subnormal.

The present invention is concerned primarily with providing an effective auxiliary suspension for vehicles enabling operation thereof over varying conditions of axle load limitation.

In particular, the invention is concerned with the provision of a removable auxiliary suspension assembly adapted for selective movement into road engaging and load supporting operating position during periods in which the vehicle is traversing roadways of low axle load limitation or alternatively for operation of the vehicle under conditions of a temporarily abnormally high load condition.

An object of the invention is to provide an improved retractable auxiliary suspension.

A further object is to provide a retractable suspension which is especially adapted for mounting in a conventional multi-passenger vehicle.

Another object is to provide a motor bus construction in which the retractable suspension is mounted in a portion of the space normally forming a baggage compartment, and is constructed and arranged so as to require minimum reduction in baggage space.

A still further object is to provide a construction of the character described which is readily demountable when the vehicle is utilized exclusively for operation over roadways in which the primary suspension satisfies all existing axle load limitations.

The foregoing and other objects, advantages and features of the invention will become more readily apparent as reference is had to the accompanying specification and drawings wherein.

Figures 1, 2:
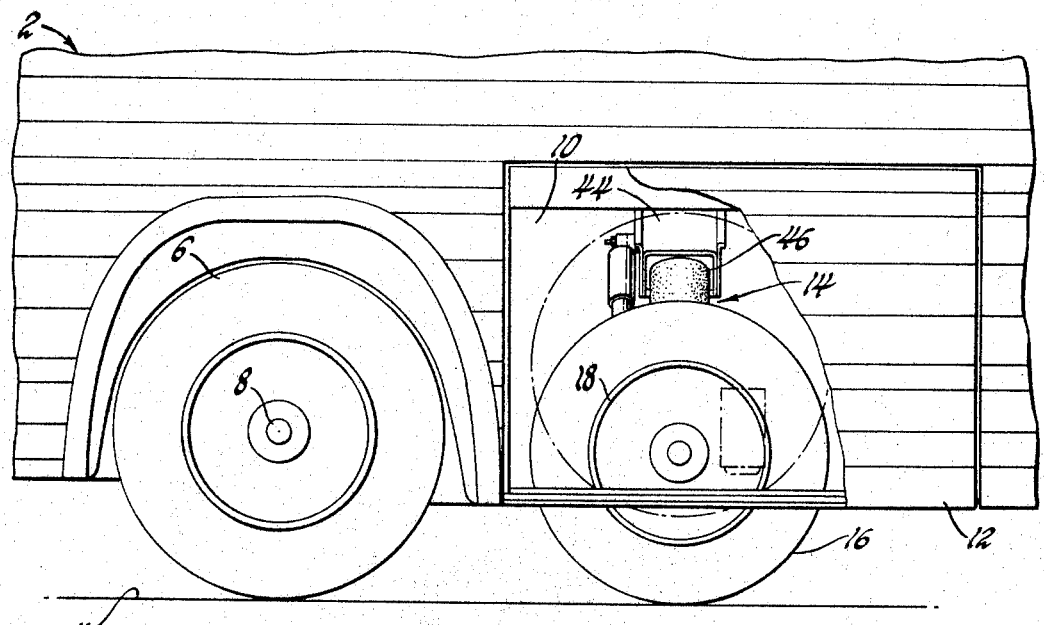
FIGURE 1 is a fragmentary side elevational view of a portion of a motor bus incorporating an auxiliary suspension system in accordance with the invention.
FIGURE 2 is an enlarged front elevational view, partly in section, illustrating the details of construction of the auxiliary suspension unit, with the various parts being shown in positions occupied when the unit is being utilized to augment the primary suspension.

Referring now to the drawings and particularly FIGURE 1, reference numeral 2 generally designates the body or superstructure of a motor bus of the conventional type which is normally supported relative to the road 4 by primary suspension springs, not shown, disposed between a pair of rear road wheels 6 mounted on a single rear axle 8 and a pair of forward dirigible road wheels, also not shown. Immediately rearwardly of road wheel 6, the superstructure 2 is provided with a longitudinally extending baggage compartment 10 having a swing-up access door 12 disposed thereover. Mounted within compartment 10 is a detachable auxiliary suspension unit 14 adapted for selective lowering into road engagement or retraction into a non-road-engaging position by remote control means, not shown.

In accordance with one feature of the invention, to miimize baggage space loss, unit 14 is constructed and arranged for transverse parallelogram movement between operating and non-operating positions. As seen best in FIGURE 2, retractable unit 14 comprises a pneumatic tire 16 mounted on a road wheel 18 rotatably mounted on a steering knuckle 20. The upper and lower ends, respectively, of knuckle 20 are universally pivotally connected at 22 and 24 to the outer ends of generally transversely extending upper and lower wheel control arms 26 and 28. At their inboard ends, arms 26 and 28 are pivotally connected to a support member 30 at 32 and 34 for swinging movement on generally parallel longitudinally extending axes 36 and 38. Support member 30, in turn, is detachably secured to a vehicle superstructure bulkhead 40 as by bolts 42. Vertically above upper control arm 26, bulkhead 40 is additionally provided with an angle bracket or perch 44 forming the upper seat for a single convolution rolling lobe air spring casing 46, the lower end of which is engaged by a piston 48 secured to the upper control arm 26. The interior of spring 46 is adapted for communication with a source of high pressure air through suitable conduit means permitting selective energization and deenergization. When energized, air spring 46 urges control arms 26 and 28 and road wheel 18 downwardly into a position in which the tire 16 effects rolling engagement with the ground 4 whereupon the gross load formerly exclusively sustained by the road wheel 6 is partially transferred to road wheel 18.

Figure 3:
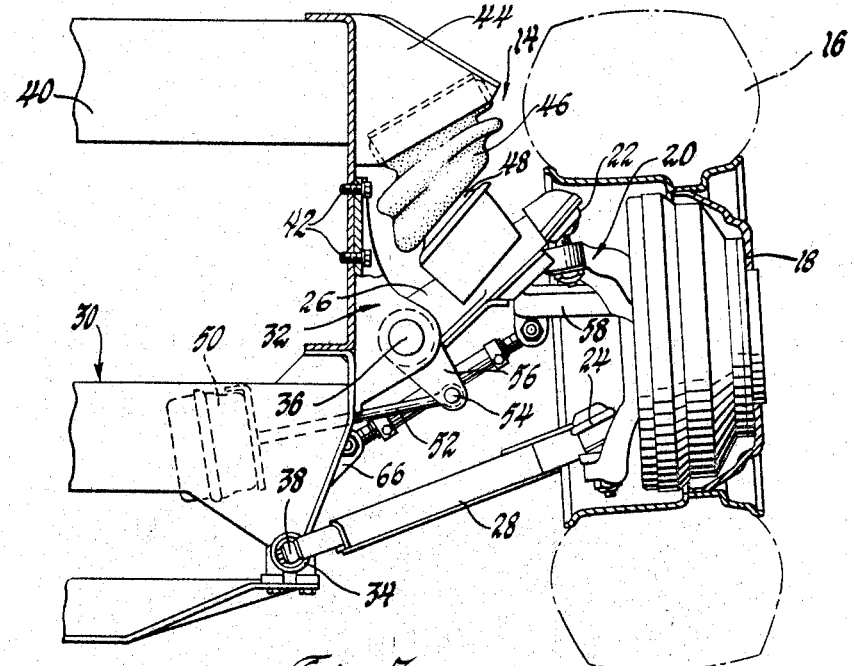
FIGURE 3 is a view similar to FIGURE 2 illustrating the relationship of the parts in the retracted or non-operating position.

Mounted on support 30 transversely inwardly from wheel 18 is a fluid motor assembly 50 of conventional construction such as used in air brakes. Connected to motor 50 is a plunger element 52 extending outwardly therefrom and pivotally connected at 54 to the lower end of a depending bell crank member 56 formed on upper control arm 26. Fluid motor 50 is adapted upon energization thereof to displace plunger 52 outwardly to cause counterclockwise rotation of bell crank 56 and thereby swing control arm 26 upwardly to cause retraction of road wheel 18 to a non-road-engaging position in baggage compartment 10, as illustrated in FIGURE 3. It will be understood that energization of motor 50 is intended to be accompanied by deenergization of air spring 46, and vice versa. However, since the particular fluid circuitry and control elements thereof necessary to accomplish such function are of conventional character and form no part of the invention, further description thereof is omitted. It will also be understood that such control elements are preferably located for convenient accessibility to the vehicle operator.

Figure 4:
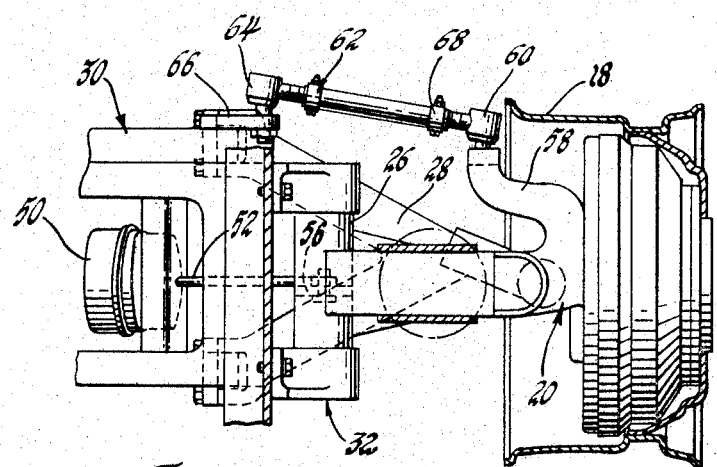
FIGURE 4 is a top plan view, partly in section, of the structure shown in FIGURES 2 and 3.

In order to effect precise control of rotational alignment of the auxiliary wheel 18, in accordance with another feature of the invention, as seen best in FIGURE 4, the wheel knuckle 20 is provided with a trailing leg 58, the terminal end of which is universally pivotally connected at 60 to the outboard end of a link 62, the inboard end of which is universally pivotally connected at 64 to a bracket 66 located vertically midway between the inboard longitudinal axes 36 and 38 of upper and lower control arms 26 and 28. Link 62 is provided with turn buckle adjustment means 68 enabling precise adjustment of the plane of rotation of wheel 18.

From the foregoing it will be seen that a simple, efficient and economical auxiliary suspension unit has been provided which not only occupies a minimum of baggage compartment space and affords ready accessibility for repair and adjustment, but also permits of rapid installation and removal.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a motor vehicle having a superstructure normally resiliently supported relative to the ground by primary suspension springs operatively disposed between the superstructure and laterally spaced longitudinally aligned pairs of wheels, a retractable auxiliary independent suspension comprising, a support removably connected to said superstructure, upper and lower laterally directed control arms pivotally connected at their inner ends to said support on generally parallel longitudinally extending axes, a wheel knuckle extending vertically between and pivotally connected to the outer ends of said arms, a wheel rotatably mounted on said knuckle, a spring perch mounted on said superstructure above said upper control arm, a selectively inflatable air spring extending between said seat and said upper control arm operative when inflated to urge said wheel into rolling engagement with the ground, a bell crank formed on one of said control arms, a selectively energizable fluid motor mounted on said superstructure, and a link interconnecting said fluid motor with said bell crank, said fluid motor being operative when energized to axially displace said link in a direction causing said control arms to swing upwardly and thereby retract said wheel from ground engaging contact.

2. The invention of claim 1 wherein said wheel knuckle is universally pivotally connected to said upper and lower control arms, and including a link spaced longitudinally from said control arms universally pivotally connected at its opposite ends to said bracket and said knuckle respectively.

3. The invention of claim 2 wherein said link is adjustable in length to establish and maintain tracking alignment of said wheel during rising and falling movement thereof.

4. The invention of claim 1 wherein said air spring comprises a flexible casing detachably secured to said perch and having a rolling lobe portion arranged in surrounding relation with a piston element mounted on said upper control arm.

5. The invention of claim 1 wherein said superstructure includes baggage compartments arranged in longitudinal alignment with one of said pairs of wheels within which said auxiliary suspension units are mounted, each baggage compartment including hinged doors providing installation and service access to said units.

References Cited
UNITED STATES PATENTS 2,974,976   3/1961   Lyall.
3,033,553   5/1962   Allinquant.

PHILIP GOODMAN, Primary Examiner

U.S. Cl. X.R.

180—22